United States Patent

Chen et al.

[11] Patent Number: 6,067,438
[45] Date of Patent: May 23, 2000

[54] FUSER MEMBER WITH FLUORO-SILICONE IPN NETWORK AS FUNCTIONAL RELEASE AGENT DONOR ROLLER

[75] Inventors: Jiann-Hsing Chen, Fairport; Stephen V. Davis, Rochester; Biao Tan, Rochester; James E. Mathers, Rochester; Borden H. Mills, Webster, all of N.Y.

[73] Assignee: Eastman Kodak Company, Rochester, N.Y.

[21] Appl. No.: 09/157,391

[22] Filed: Sep. 18, 1998

[51] Int. Cl.[7] .................................................. G03G 15/20
[52] U.S. Cl. ........................................................ 399/325
[58] Field of Search .................................... 399/320, 324, 399/325

[56] References Cited

U.S. PATENT DOCUMENTS

| | | | |
|---|---|---|---|
| 4,257,699 | 3/1981 | Lentz | 430/98 X |
| 4,264,181 | 4/1981 | Lentz et al. | 430/98 X |
| 4,272,179 | 6/1981 | Seanor | 430/98 X |
| 4,387,176 | 6/1983 | Frye | 524/268 |
| 4,536,529 | 8/1985 | Frye et al. | 524/284 |
| 4,659,621 | 4/1987 | Finn et al. | 428/339 |
| 5,035,950 | 7/1991 | Del Rosario | 428/421 |
| 5,061,965 | 10/1991 | Ferguson et al. | 430/99 X |
| 5,141,788 | 8/1992 | Badesha et al. | 428/36.8 |
| 5,166,031 | 11/1992 | Badesha et al. | 430/124 |
| 5,370,931 | 12/1994 | Fratangelo et al. | 399/339 X |
| 5,500,298 | 3/1996 | Badesha | 399/339 X |
| 5,534,347 | 7/1996 | Chen et al. | 399/320 X |
| 5,582,917 | 12/1996 | Chen et al. | 428/421 |
| 5,587,208 | 12/1996 | Badesha et al. | 399/320 X |
| 5,824,416 | 10/1998 | Chen et al. | 428/422 |

OTHER PUBLICATIONS

*3M Processing Digest*, vol. 17(3), Oct. 1986.

*Primary Examiner*—Fred L. Braun
*Attorney, Agent, or Firm*—Doreen M. Wells

[57] ABSTRACT

A release agent donor member for a toner fixing system, the donor member includes: a base member; an optional intermediate layer; and an outermost layer of a polymeric composition containing a cured interpenetrating network or (a) fluorocarbon elastomer and (b) at least one silicone elastomer of polyfunctional poly($C_{(1-6)}$ alkyl) siloxane polymer; polyfunctional poly($C_{(1-6)}$ alkyl)arylsiloxane polymer; and combinations thereof; wherein a functionalist release agent is applied to the outer surface of the outermost layer; and wherein the outermost layer contains a metal oxide in an amount sufficient to interact with the functionalist release agent. The fluorocarbon elastomer can be a terpolymer of vinylideneflouride, hexafluoropropylene, and tetraflouroethylene, wherein the vinylideneflouride is present in an amount greater than 45 mole percent.

16 Claims, 1 Drawing Sheet

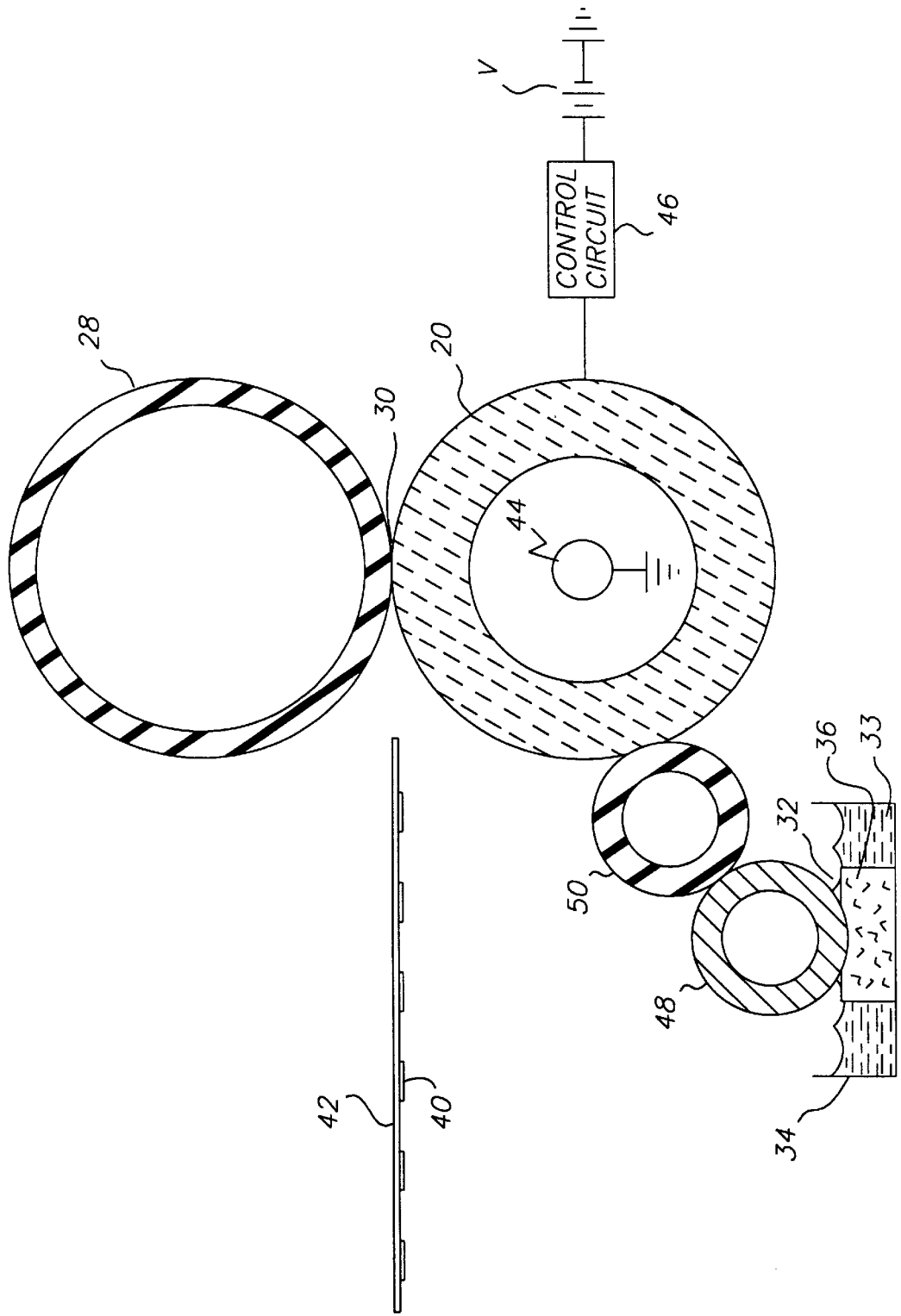

FUSER MEMBER WITH FLUORO-SILICONE IPN NETWORK AS FUNCTIONAL RELEASE AGENT DONOR ROLLER

CROSS REFERENCE TO RELATED APPLICATIONS

Reference is made to commonly-assigned copending U.S. patent application Ser. No. 09/156,996 filed herewith, entitled RELEASE AGENT DONOR MEMBER WITH FLUOROSILICONE INTERPENETRATING NETWORK, by Stephen Davis, Jiann-Hsing Chen, Muhammed Aslam and Fangsheng Wu, and U.S. patent application Ser. No. 09/156,831 filed herewith, entitled FLUOROSILICONE INTERPENETRATING NETWORK AND METHODS OF PREPARING SAME, by Stephen Davis, Jiann-Hsing Chen and Nataly Boulatnikov.

FIELD OF THE INVENTION

The present invention relates generally to an electrophotographic printing apparatus and more particularly to a fusing system for fixing toner material to support substrate. In particular the present invention relates to a release agent donor member for a toner fixing station in such apparatus.

BACKGROUND OF THE INVENTION

In the process of electrophotography, a light image of an original to be copied is typically recorded in the form of an electrostatic latent image upon a photosensitive member with subsequent rendering of the latent image visible by the application of electroscopic marking particles commonly referred to in the art as toner. By methods now well known in the art, the residual toner image can be either fixed directly upon the photosensitive member or transferred from the member to another support, such as a sheet of plain paper, with subsequent affixing of the image thereto.

Problems associated with transferring the latent image to a support, especially the problem referred to as "toner offset", have been well documented in the field. Methods of overcoming the problem have also been documented. For example, U.S. Pat. No. 4,264,181 to Lentz et al., U.S. Pat. No. 4,257,699 to Lentz and U.S. Pat. No. 4,272,179 to Seanor, all commonly assigned to Xerox, describe fuser members and methods of fusing thermoplastic resin toner images to a substrate wherein a polymeric release agent having functional groups is applied to the surface of the fuser member.

While the mechanism involved is not completely understood, it has been observed that when certain polymeric fluids having functional groups are applied to the surface of a fusing member having an elastomer surface with a metal oxide, metal salt, metal, metal alloy or other suitable metal compounds dispersed therein there is an interaction (a chemical reaction, coordination complex, hydrogen bonding or other mechanism) between the metal of the filler in the elastomer and the polymeric fluid having functional groups so that the polymeric release agent having functional groups in the form of a liquid or fluid provides an excellent surface for release which have an excellent propensity to remain upon the surface of the fuser member. Regardless of the mechanism, there appears to be the formation of a film upon the elastomer surface which differs from the composition of the elastomer and the composition of the polymeric release agent having functional groups. This film, however, has a greater affinity for the elastomer containing a metal compound than the toner and thereby provides an excellent release coating upon the elastomer surface. The release coating has a cohesive force which is less than the adhesive forces between heated toner and the substrate to which it is applied and the cohesive forces of the toner. The interaction between the functional group of the polymeric release agent and the metal of the elastomer containing metal leads to an overall diminution of the critical or high surface energy of the metal in the metal containing filler.

According to techniques known in the art, the toner release agents may be applied to the fuser roll by several delivery mechanisms including wicking, impregnating webs and by way of a donor roll which may comprise a high temperature vulcanized silicone rubber material.

While these silicone elastomer donor rolls have been commercially successful in some commercial applications they suffer from certain difficulties in that they tend to swell from being in contact with a silicone oil release agent which migrates or is absorbed into the silicone rubber. While a small degree of swelling may be acceptable if it is uniform, failure of such rolls has been observed by excessive swelling over a period of operation wherein the donor roll may actually be twice the original size. Under such circumstances, the silicone rubber donor roll may no longer function in providing a uniform layer of release fluid to the fuser roll.

Further, while donor rolls such as those described in U.S. Pat. No. 4,659,621 have attractive oil delivery capabilities in that they are capable of transporting sufficient quantities of functional release agent to the fuser roll to form the interfacial barrier layer between the fuser roll and the toner, they also tend to swell with the oil penetrating the rubber whereby there may be an interchange of the siloxane oil with the siloxane in the silicone rubber network leading to breakdown of the network and a lower crosslinked network. This reduces the toughness of the silicone rubber barrier layer as more release agent penetrates the surface. This difficulty is particularly pronounced when operating at temperatures in excess of 300° F. Another failure mode is referred to as debonding wherein the swelling of the silicone rubber becomes so significant that it actually delaminates from the core of the donor roll.

Another recent development described in U.S. Pat. No. 5,061,965 to Ferguson et al. describes the use of a donor roll made of a base member, an intermediate comformable silicone elastomer layer, and an elastomer release layer comprising poly(vinylidene fluoride-hexafluoropropylene-tetrafluoroethylene) where the vinylidene fluoride is present in an amount <40 mole %, a metal oxide present in an amount sufficient to interact with polymeric release agent having functional groups to transport a sufficient amount of polymeric release agent to provide an interfacial barrier layer between the fusing surface and the toner. This donor roller suffers from the oil wetting capability between non-functional PDMS release agent and the nonreactive donor roller surface, since the invention counts on the polymeric release agent having functional groups to react with the metal oxide which is dispersed in the fluoroelastomer layer.

It would be desirable to have further improvement in the field to overcome the problems of toner offset and donor roll durability.

SUMMARY OF THE INVENTION

In accordance with the present invention, a long life, non-oil swelling, composite release agent donor member is described. This donor roller is to be used in a fusing assembly of the type wherein a functional polymeric release agent is applied to the surface of fuser members which come into contact with toner. This composite oiler donor roller has a fluorocarbon/silicone elastomer interpenetrating network coating which contains reactive metal oxides in amounts sufficient to react with polymeric release agents wherein the polymeric release agents have functional groups such as carboxy, hydroxy, hydride, epoxy, amino, isocyanate, thioether and mercapto groups as release fluids.

In one specific aspect of the present invention, there is provided a release agent donor member for a toner fixing system, the donor member comprising, in order:

a base member;

an optional intermediate layer; and an outermost layer comprising a polymeric composition containing a cured interpenetrating network of (a) fluorocarbon elastomer and (b) at least one silicone elastomer selected from polyfunctional poly($C_{(1-6)}$ alkyl)siloxane polymer; polyfunctional poly($C_{(1-6)}$ alkyl)arylsiloxane polymer; and combinations thereof; wherein the outermost layer contains a metal oxide present in an amount sufficient to interact with a functionalized release agent which may be applied to the outer surface of said layer.

More specifically, the optional intermediate layer comprises a conformable silicone elastomer; and the outermost layer (also called the release agent donor layer) comprises the terpolymer poly(vinylidenefluoride-hexafluoropropylene-tetrafluoroethylene) wherein the vinylidenefluoride is present in an amount greater than 45 mole percent; fluorocarbon-curing agent; fluorocarbon cure accelerator; and siloxane polymer(s) including one or more curable, silanol-terminated, polyfunctional poly($C_{(1-6)}$ alkyl)siloxane polymers, said siloxane polymer comprising at least two different functional siloxane units selected from the group consisting of monofunctional, difunctional, trifunctional and tetrafunctional siloxane units or one or more curable, silanol-terminated, polyfunctional poly($C_{(1-6)}$ alkyl)arylsiloxane polymers, said siloxane polymer comprising at least two different functional siloxane units selected from the group consisting of monofunctional, difunctional, trifunctional and tetrafunctional siloxane units to form a fluorosilicone interpenetrating network. The fluorosilicone interpenetrating network release agent donor layer is cured from a solvent solution thereof in the presence of more than 5 parts by weight of inorganic base per 100 parts of polymer, said inorganic base being effective to partially dehydrofluorinate the vinylidenefluoride. The release fluid for this system can be a functionalized polydimethylsiloxane with functional groups as described above.

In a further aspect of the present invention the intermediate silicone elastomer layer comprises the crosslinked product of a mixture of crosslinking agent and crosslinking catalyst and at least one polyorganosiloxane having the formula:

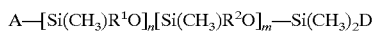

A—[Si(CH$_3$)R$^1$O]$_n$[Si(CH$_3$)R$^2$O]$_m$—Si(CH$_3$)$_2$D wherein:

R$^1$ and R$^2$ may be any of hydrogen or unsubstituted alkyl, alkenyl or aryl having less than 19 carbon atoms or fluorosubstituted alkyl having less than 19 carbon atoms;

each of A & D may be any of hydrogen, methyl, hydroxyl or vinyl groups; and m and n are both integer numbers defining the number of repeat units and independently range from 0 to 10,000.

In a further aspect of the present invention the intermediate layer is from about 0.5 millimeters to about 7.5 millimeters thick and the release agent donor layer is from about 0.0125 to about 0.125 mm thick The donor member has a hardness greater than 30 Shore A.

BRIEF DESCRIPTION OF THE DRAWINGS

The FIGURE is a schematic front cross-sectional view of a fuser in accordance with the present invention.

DETAILED DESCRIPTION OF THE INVENTION

Referring now to FIG. 1 a fuser is shown which includes a fuser roller 20 and an elastomeric pressure roller 28 which form a nip 30. A supply of offset preventing oil 33 is shown provided in a oil reservoir 34. The fuser roller 20 can be made of zirconia ceramic and its composites as will be discussed later. Particulate imaging material 40 disposed on a receiver 42 is fused into the receiver 42 at the nip 30 by the application of heat and pressure. As shown a heating lamp 44 is connected to a control circuit 46. The heating lamp 44 is well known to those skilled in the art and is provided inside the core of the fuser roller 20. Alternatively, the fuser may be externally heated by a heated roller riding along the fuser roller. This external heater may replace or merely assist the internal lamp. It will be understood depending on the particulate imaging material 40 that is used that only pressure need be applied to fuse particulate imaging material 40 into the receiver 42. A wicking device 32 shown in the form as a wick 36, absorbs the offset preventing oil 33 and is contacted by a metering roller 48 intermediate between the fuser roller 20 and the metering roller 48 is a donor roller 50. donor roller 50 delivers offset preventing oil 33 to the particulate imaging material 40 to the receiver 42. A continuous supply of offset preventing oil 33 must be used which is approximately 1 to 20 mg per receiver 42, on which particulate imaging material is fixed. This offset preventing oil is functional polydimethylsiloxane in the viscosity range of 50 to 2000 cts. The polymeric release agents have functional groups such as carboxy, hydroxy, hydride, epoxy, amino, isocyanate, thioether and mercapto groups The release agent donor member according to the present invention is made by the method described in copending, commonly-owned U.S. patent application Ser. No. 09/156, 831, entitled FLUOROSILICONE INTERPENETRATING NETWORK AND METHODS OF PREPARING SAME, by Stephen Davis, Jiann-Hsing Chen and Nataly Boulatnikov, filed on even date herewith and incorporated herein in its entirety by reference.

The composite donor member is an economical, highly reliable, long life cylindrical roll which is conformable with a fuser roller in a fuser assembly. The donor member uniformly delivers to the fuser roller a sufficient amount of a polymeric release agent having functional groups. This provides an interfacial barrier layer between the fusing surface and the toner. By selecting the structure of the release agent donor member and materials of the composite according to the present invention the positive properties of the individual components are accentuated while the negative properties are minimized. Thus, as previously described, although silicone elastomer rolls, as release agent donor members, on their own tend to swell and fail, with the donor member of the invention, the release agent does not penetrate into the donor member and bring about early failure from swelling.

In particular, the donor member of the invention operates within a fusing assembly for fixing toner images to a substrate, wherein a polymeric release agent having functional groups is applied to the surface of a fuser roller. The assembly comprises:

(A) a heated fuser roll;
(B) a pressure roller engaging said fuser roller to provide a nip therebetween through which a copy sheet having an unfused toner image may be passed to fuse said toner image by contact with said heated fuser roll; and
(C) means to apply a polymeric release agent having functional groups to the surface of said fuser roll, said means including a release agent donor member comprising a base member, an intermediate conformable silicone elastomer layer and an elastomer release agent donor layer comprising poly(vinylidenefluoride-hexafluoropropylene-tetrafluoroethylene) where the vinylidenefluoride is present in an amount greater than 45 mole percent, a metal oxide present in an amount sufficient to interact with the polymeric release agent having functional groups to transport a sufficient amount of polymeric release agent to provide an interfacial barrier layer between the surface and the toner and being substantially unreactive with said elastomer, said elastomer release agent donor layer having been cured from a solvent solution thereof with a nucleophilic curing agent soluble in said solution and in the presence of less than 4 parts by weight of inorganic base per 100 parts of polymer, said inorganic base being effective to at least partially dehydrofluorinate the vinylidenefluoride.

In operation the four rolls may be independently driven or according to a preferred embodiment of the present invention, the drive input is directed to the fuser roll with the release agent donor roll 50 being driven by frictional contact with the surface of the fuser roll 20 and the oil metering roll 48 being driven by frictional contact with the release agent donor roll 50 in the direction indicated by the arrows in FIG. 1. The pressure roll 28 may also be driven by frictional control with the fuser roll thereby forming the fusing nip there between it and fuser roll 20. As the donor roll 50 rotates in contact with the fuser roll 20 the thin film of offset preventing release agent 33 on the donor roll 50 is split with a portion about 50 percent being transferred to the fuser roll 20, and a portion being retained on the donor roll 50.

The release agent donor roll according to the present invention may comprise a shaft with a solid or hollow cylinder about 8 millimeters to 22 millimeters in diameter and a conformable donor surface coating from 3 to about 7 millimeters in thickness. The surface coating may be even thicker if desired to adjust for certain nip characteristics. Typically the rolls are from about 10 to 18 inches in length.

As used herein, the term "copolymer" refers to the product of polymerization of two or more substances at the same time, for example terpolymers which contain three distinct monomers.

The fluorosilicone interpenetrating network elastomers which may be used with the release agent donor member of the present invention must be elastomers which can withstand elevated temperatures generally from about 90° C. to about 200° C. or higher, depending on the temperature desired for fusing or fixing the thermoplastic resin powder to the substrate.

The coating composition is obtained by compounding the fluorocarbon copolymer, metal oxide or hydroxides to act as acid acceptors, fluorocarbon-curing agent, metal oxide to react with functionalized release fluid, and a fluorocarbon-curing accelerator and optionally other fillers to form a material suitable for dispersion in a solvent. The curing agent may be omitted at this stage and added just before the composition is applied as a coating to a surface. The accelerator promotes crosslinking between the curing agent and the fluorocarbon copolymer. Metal oxide filler that can react with functionalized release fluids include cupric oxide, cuprous oxide, and lead oxide, present in an amount sufficient to react with the functionalized polymeric release agent. In general, the metal oxide is present in an amount of 3–40 parts by weight per 100 parts by weight of polymer and has a particle diameter from about 0.5 to about 40 microns. Other fillers include but are not limited to carbon black, graphite, aluminum oxide, and similar materials.

Prior to coating this material, a curable polyfunctional poly($C_{(1-6)}$ alkyl)siloxane polymer and/or a curable polyfunctional poly($C_{(1-6)}$ alkyl)arylsiloxane polymer is added. The siloxane polymer is preferably heat-curable and can comprise one or more polyfunctional poly($C_{(1-6)}$ alkyl) siloxane polymers, copolymer, polyfunctional poly($C_{(1-6)}$ alkyl)arylsiloxane polymer or reaction products of such materials. The siloxane polymer is cured concurrently with the fluorocarbon copolymer or terpolymer. The resulting mixture is solution milled to form a homogeneous mixture suitable for coating in thin film applications. Details of the method are described in copending, commonly-owned U.S. patent application Ser. No. 09/156,831, entitled FLUOROSILICONE INTERPENETRATING NETWORK AND METHODS OF PREPARING SAME, by Stephen Davis, Jiann-Hsing Chen and Nataly Boulatnikov, filed on even date herewith and incorporated herein in its entirety by reference.

While not wishing to be bound by any particular theory, it is believed that the concurrent curing of the individual polymers of the mixture results in an interpenetrating network of the separately crosslinked polymers. That is, the network formed by crosslinking the fluorocarbon copolymer or terpolymer with the fluorocarbon-curing agent and the network formed by crosslinking of the polyfunctional siloxane polymer mesh together to create an interpenetrating polymeric network. The cured polymeric mixture forms a coating with advantageous release properties attributable to the silicones and mechanical and chemical properties characteristic of the fluorocarbon copolymer or terpolymer are retained.

Fluorocarbon copolymers and silicones tend to phase separate because, on a molecular level, they are incompatible and will not readily mix. Phase separation can be avoided by the methods of the instant invention. Specifically by:

compounding the fluorocarbon copolymers and the optional addenda, such as the curing agent, accelerators and fillers to form an intimate, homogeneous, solid mixture; and dispersing the solid mixture along with the curable polyfunctional poly($C_{(1-6)}$ alkyl)siloxane polymer and/or curable polyfunctional poly($C_{(1-6)}$ alkyl)arylsiloxane polymer with a molecular weight sufficient to allow dispersion. Also, the solvent system must not hinder reaction of the silicon phase as such hindered reaction would cause subsequent phase separation. By "suitable solvent" is meant a solvent that can dissolve both phases and will not restrict the silicone cure. One such appropriate solution is 2-butanone preferably containing less then 5% by weight of methanol. Minimal methanol is needed in contrast to 3M Processing Digest, Vol 17 (3), October 1986 describing the use of methanol to increase solution pot life. As the reaction rate slows in solution the tendency for phase separation increases. Other suitable solvents include methyl ethyl ketone, methyl isobutyl ketone, ethyl ethyl ketone and mixtures of the foregoing containing less than 15% of the cosolvents methanol, ethanol and acetone as well as similar solvents/solvent systems as would be known by those skilled in the art.

In a preferred embodiment of the invention, the fluorosilicon interpenetrating network comprises a solid fluorocarbon copolymer and a liquid, curable polyfunctional poly($C_{(1-6)}$ alkyl)siloxane polymer, for example, a polyfunctional hydroxy-functionalized poly($C_{(1-6)}$ alkyl) siloxane polymer.

The siloxane polymer preferably has a number average molecular weight range of greater than 20,000 when measured, for example, by size-exclusion chromatography (SEC). The polyfunctional poly($C_{(1-6)}$ alkyl)arylsiloxane polymer preferably has a number average molecular weight range of greater than 2000 when measured, for example, by size exclusion chromatography.

Such components do not readily form homogeneous mixtures due to phase separation. However, the present invention teaches that by solution dispersion in a media conducive to further polymerization of the polyfunctional hydroxy-functionalized poly($C_{(1-6)}$ alkyl)siloxane polymer with the mechanically compounded fluorocarbon copolymer or terpolymer and the optional addenda in the designated sequence and under the conditions taught, suitable compositions can be obtained.

Compounding (mechanical mixing) is preferably carried out in a two-roll mill by compounding the fluorocarbon copolymer or terpolymer, the accelerator and fillers (if present) until a uniform, dry, smooth sheet is obtained. This compounding process can be carried out at a temperature of, for example, from 50° to 70° F. (approx. 10° to 21° C.), preferably from 55° to 65° F. (approx. 13° to 28° C.). Compounding of the mixture prior to addition of the siloxane oil affords an even band in 30 to 60 minutes. The fluorocarbon-curing agent can then be added and compounded in until a uniform, dry, flexible composite sheet is obtained. Variations in the order of addition of the components can be made by those skilled in the art without causing disintegration of the composition. Subsequently, the liquid, curable siloxane polymer is added along with the compounded material (now in sheet form), into a suitable solvent so that the siloxane oil is uniformly distributed and in intimate contact with the fluorocarbon copolymer.

The composition obtained by such a process can be reduced to small particles for dispersing in a coating solvent without phase separation occurring. The particles are small enough to effect solution of the soluble components in less than about 5 hours, thus minimizing gel formation for compositions having a tendency to gel rapidly. Before the composition is applied as a coating, it must be degassed to remove all dissolved gasses.

In yet another aspect of the invention, for example when a solvent transfer coating process is contemplated, the fluorocarbon-curing agent can be withheld from the compounding mixture and added to the coating medium, thus minimizing any tendency for premature curing of the composition.

Suitable fluorocarbon copolymers of the invention include the vinylidene fluoride based fluoroelastomers containing hexafluoropropylene known commercially as Viton® A. Also suitable are the terpolymers of vinylidene fluoride, hexafluoropropylene and tetrafluoroethylene known commercially as Viton® B and Fluoore™ FX-9038. Vitono® A and Viton® B and other Viton® designations are trademarks of E.I. Dupont de Nemours and Company.

commercially available materials include, for example, vinylidene fluoride-hexafluoropropylene copolymer or terpolymers Fluorel™ FX-2530, Fluorel™ FC 2174 and Fluorel™ FC 2176. Fluorel™ is a trademark of 3M Company. Other vinylidene fluoride based polymers which can be used are disclosed in U.S. Pat. No. 5,035,950, the disclosure of which is hereby incorporated by reference. Mixtures of the foregoing vinylidene fluoride-based fluoroelastomers may also be suitable. Although it is not critical in the practice of this invention, the number-average molecular weight range of the fluorocarbon copolymer or terpolymers may vary from a low of about 10,000 to a high of about 200,000. In the more preferred embodiments, the vinylidene fluoride-based fluoroelastomers have a number-average molecular weight range of about 50,000 to about 100,000.

Suitable fluorocarbon-curing agents or crosslinking agents for use in the process of the invention include the nucleophilic addition curing agents as disclosed, for example, in the patent to Seanor, U.S. Pat. No. 4,272,179, incorporated herein by reference. The nucleophilic addition cure system is well known in the prior art. Exemplary of this cure system is one comprising a bisphenol crosslinking agent and an organophosphonium salt as accelerator. Suitable bisphenols include 2,2-bis(4-hydroxyphenyl) hexafluoropropane, 4,4-isopropylidenediphenol and the like. Although other conventional cure or crosslinking systems may be used to cure the fluoroelastomers useful in the present invention, for example, free radical initiators, such as an organic peroxide, for example, dicumyl peroxide and dichlorobenzoyl peroxide, or 2,5-dimethyl-2,5-di-t-butylperoxyhexane with triallyl cyanurate, the nucleophilic addition system is preferred.

Suitable accelerators for the bisphenol curing method include organophosphonium salts, e.g., halides such as benzyl triphenylphosphonium chloride, as disclosed in U.S. Pat. No. 4,272,179 cited above.

Suitable fillers for producing these composites include mineral oxides, such as alumina, silicate or titanate, and carbon of various grades. Nucleophilic addition-cure systems used in conjunction with fluorocarbon copolymer or terpolymers can generate hydrogen fluoride and thus acid acceptors are added as fillers. Suitable acid acceptors include metal oxides or hydroxides such as magnesium oxide, calcium hydroxide, lead oxide, copper oxide and the like, which can be used as mixtures with the aforementioned fillers in various proportions.

The preferred curable polyfunctional poly($C_{(1-6)}$ alkyl) siloxane and/or a curable polyfunctional poly($C_{(1-6)}$ alkyl) arylsiloxane polymers, useful in the practice of this invention, when cured concurrently with the fluoroelastomers, produce a coating suitable for use as the surface coating of a fusing member. Such coated fusing members have low energy surfaces which release toner images with minimal offset. These coatings can also be advantageously used with small amounts of externally added polymeric release agents, for example mercapto-, amino-, or silane-functionalized polydimethylsiloxanes, to further minimize offset.

Preferred curable polyfunctional poly($C_{(1-6)}$ alkyl) siloxane polymers and/or a curable polyfunctional poly($C_{(1-6)}$ alkyl)arylsiloxane polymer are heat-curable silicones; however peroxide-curable silicones can also be used with conventional initiators. Heat-curable silicones include the hydroxy-functionalized polyfunctional organopolysiloxanes belonging to the class of silicones known as "soft" silicones. Preferred soft silicones are silanol-terminated polyfunctional organopolysiloxanes containing repeating units of the formula, $(R^1)_a SiO^{(4-a)/2}$ wherein $R^1$ is $C_{(1-6)}$ alkyl and a is 0 to 3.

Alkyl groups which $R^1$ can represent include methyl, ethyl, propyl, isopropyl, butyl, sec.butyl, pentyl and hexyl. Preferred soft silicones are those in which $R^1$ is methyl.

Preferred curable poly($C_{(1-6)}$ alkyl)arylsiloxane polymers are heat-curable siloxanes, however peroxide-curable siloxanes can also be used with conventional initiators. Heat curable siloxane polymers include the hydroxy-functionalized organopolysiloxanes belonging to the classes of silicones known as "hard" and "soft" silicones. Preferred hard and soft silicones are silanol-terminated polyfunctional organopolysiloxanes containing repeating units of the formula, $R^1{}_a R^2{}_b SiO_{(4-(a+b))}$ Wherein:$R^1$ and $R^2$ are independently ($C_{(1-6)}$ alkyl) or aryl; and a and b are independently 0 to 3

Alkyl groups which $R^1$ and $R^2$ can represent include methyl, ethyl, propyl, isopropyl, butyl, sec.butyl, pentyl and hexyl. Preferred hard and soft silicones are those in which $R^1$ and $R^2$ are independently methyl or phenyl.

Both hard and soft silicones can contain various proportions of mono-, di-, tri- and tetra-functional siloxane repeating units. The degree of functionality influences the hardness of the silicone. In general, the greater the functionality, the harder is the silicone. However, the predominant influence on hardness is the ratio of aryl to alkyl groups present. Preferred hard silicones are characterized by having a ratio of phenyl to methyl groups greater than 0.5 and are nonflowable, preferably between about 2 to 1. Soft silicones have a ratio of aryl to methyl groups less than 0.5, preferably no phenyl groups are present and are flowable. Hard silicones generally have a number-average molecular weight of less than about 10,000, preferably less than about 4,000. Polyfunctional hard silicones of such molecular weights have a high level of crosslinking on curing which contributes to the hardness. Soft silicones generally have a number-average molecular weight of greater than 20,000, preferably greater than 100,000 which results in a low level of crosslinking on curing hard and soft silicones can be used singly or as mixtures of silicones and, in addition, can contain minor amounts of one or more polyfunctional silicones having number-average molecular weights in the range of 1,000 to 300,000.

Particularly suitable silicones are the heat-curable silanol-terminated hard silicone copolymers comprising difunctional and trifunctional siloxane repeating units of the formulae, $R^3{}_2 SiO$ and $R^4 SiO_{1.5}$, wherein $R^3$ and $R^4$ are independently methyl or phenyl provided that the ratio of phenyl to methyl groups is at least about 1 to 1.

Exemplary hard and soft silicones are commercially available or can be prepared by conventional methods. For example, DC6-2230 silicone and DC-806A silicone (sold by Dow Corning Corp.), are hard silicone polymers, and SFR-100 silicone (sold by General Electric Co.) and EC 4952 silicone (sold by Emerson Cummings Co.), are soft silicone polymers. DC6-2230 silicone is characterized as a silanol-terminated polymethylphenylsiloxane copolymer containing phenyl to methyl groups in a ratio of about 1 to 1, difunctional to trifunctional siloxane units in a ratio of about 0.1 to 1 and having a number-average molecular weight between 2,000 and 4,000. DC 806A silicone is characterized as a silanol-terminated polymethylphenylsiloxane copolymer containing phenyl to methyl groups in a ratio of about 1 to 1 and having difunctional to trifunctional siloxane units in a ratio of about 0.5 to 1. SFR 100 silicone is characterized as a silanol- or trimethylsilyl-terminated polymethylsiloxane and is a liquid blend comprising about 60–80 weight percent of a difunctional polydimethylsiloxane having a number-average molecular weight of about 150,000 and 20–40 weight percent of a polymethylsilyl silicate resin having monofunctional (i.e. trimethylsiloxane) and tetrafunctional (i.e. $SiO_2$) repeating units in an average ratio of between about 0.8 and 1 to 1, and having a number-average molecular weight of about 2,500. EC 4952 silicone is characterized as a silanol-terminated polymethylsiloxane having about 85 mole percent of difunctional dimethylsiloxane repeating units, about 15 mole percent of trifunctional methylsiloxane repeating units and having a number-average molecular weight of about 21,000. Other polyfunctional poly($C_{(1-6)}$ alkyl)siloxane polymers which can be used are disclosed in U.S. Pat. Nos. 4,387,176 and 4,536,529, the disclosures of which are hereby incorporated by reference.

Preferred compositions of the invention have a ratio of siloxane polymer to fluorocarbon copolymer or terpolymer between about 0.1 and 3 to 1 by weight, preferably between about 0.2 and 0.5 to 1. The composite is preferably obtained by curing a mixture comprising from about 50–70 weight percent of a fluorocarbon copolymer or terpolymer, 10–30 weight percent of a curable polyfunctional polymethylsiloxane polymer, most preferably about 20–30 weight percent. 1–10 weight percent of a fluorocarbon-curing agent, 1–10 weight percent of a fluorocarbon-curing accelerator, 9–30 weight percent of an acid acceptor type filler, 3–40 weight percent of a filler which could react with a functional oil, and 0–30 weight percent of an inert filler.

Curing of the composite is carried out according to the well known conditions for curing vinylidene fluoride based copolymer or terpolymers ranging, for example, from about 12–48 hours at temperatures of between 50° C. to 250° C. Preferably the coated composition is dried until solvent free at room temperature, then gradually heated to about 230° C. over 24 hours, then maintained at that temperature for 24 hours.

In accordance with the present invention, the coated article can be a fusing member in the form of a roll, belt or any surface having a suitable configuration for fixing or fusing a thermoplastic toner image to a receiver such as a paper sheet. The underlying structure onto which the coating is applied is called the substrate. When used with fusing rolls, substrate onto which the composite of the invention can be coated directly on is the fusing roll core preferably the coating is applied on an underlying intermediate layer which is bonded directly or indirectly to the core. This intermediate layer is preferably a silicone elastomer, for example, EC 4952 silicone (sold by Emerson Cummings Co.). When the fusing member is in the form of a belt, the belt comprises a continuous flexible substrate made of metal or polymeric material onto which the composite of the invention can be coated. The fusing members can be coated by conventional techniques, however, solvent transfer coating techniques are preferred. Coating solvents which can be used include polar solvents, for example, ketones, acetates and the like. Preferred solvents for the fluoroelastomer based composites are the ketones, especially methyl ethyl ketone and methyl isobutyl ketone. The composites of the invention are dispersed in the coating solvent at a concentration of between about 10 to 50 weight percent, preferably between about 20 to 30 weight percent and coated on the fusing member to give a 10 to 100 $\mu$m thick sheet on drying. The coated article is cured under the conditions described above.

The cured coatings of the invention have low surface energies and exhibit good adhesion to underlying layers and substrates. Such coatings have excellent resistance to abrasion as measured on a Norman Abrader apparatus and retain the advantageous mechanical and chemical properties characteristic of fluoroelastomers, such as hardness, elongation, tensile and tear strength and resistance to releasing oils. In addition, when evaluated as image-fixing media, the coatings have shown minimal reactivity with thermoplastic toner powders while showing desirable release properties with minimal or no offsettings under simulated fusing conditions.

The rolls and belts produced in accordance with the present invention are thus useful in electro-photographic copying machines to fuse heat-softenable toner to an image carrying receiver sheet. This can be accomplished by contacting a receiver, such as a sheet of paper, to which toner particles are electrostatically attracted in an imagewise fashion with such a fusing member. Such contact is maintained at a temperature and pressure sufficient to fuse the toner to the receiver.

The following examples illustrate the compounding, coating, curing and testing of fluorocarbon-silicone polymeric compositions.

The SFR-100 silicone used on the examples described below was obtained from General Electric Co. and was determined by size exclusion chromatography and NMR to consist essentially of a mixture of about 70 weight percent of a polydimethylsiloxane having a number-average molecular weight of about 150,000, and about 30 weight percent of a polytrimethylsilyl silicate resin having monofunctional and tetrafunctional repeating units in an average ratio of about 0.9 to 1 and having a number-average molecular weight of about 2,480. The optional intermediate silicone elastomer layer is a polyorganosiloxane curable to a silicone elastomer and may be selected from the commercially available condensation curable, addition curable and peroxide curable materials. Typically the silicone elastomer layer comprises the crosslinked product of a mixture of crosslinking agent and crosslinking catalyst and at least one polyorganosiloxane having the formula:

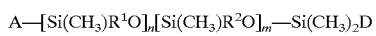

A—[Si(CH$_3$)R$^1$O]$_n$[Si(CH$_3$)R$^2$O]$_m$—Si(CH$_3$)$_2$D

Wherein:

R$^1$ and R$^2$ may be any of hydrogen or unsubstituted alkyl, alkenyl or aryl having less than 19 carbon atoms or fluorosubstituted alkyl having less than 19 carbon atoms; each of A & D may be any of hydrogen, methyl, hydroxyl or vinyl groups; and m and n are both integer numbers defining the number of repeat units and independently range from 0 to 10,000). Typically, R$^1$ and R$^2$ are hydrogen, methyl, vinyl, phenyl or trifluoropropyl.

The substrate for the release agent donor member according to the present invention may be of any suitable material. Typically, it takes the form of a cylindrical tube of aluminum steel or certain plastic materials chosen to maintain rigidity, in structural integrity, as well as being capable of having the silicone elastomer coated thereon and adhered firmly thereto. Typically the release agent donor rolls may be made by injection, compression or transfer molding, or they may be extruded. In a typical procedure the core which may be a steel cylinder is degreased with a solvent and cleaned with an abrasive cleaner prior to being primed with a primer such as Dow Corning 1200 which may be sprayed, brushed or dipped followed by air drying under ambient conditions for thirty minutes and then baked at 150° C. for 30 minutes. The silicone elastomer may be applied according to conventional techniques such as injection molding and casting after which it is cured for up to 15 minutes and at 120 to 180° C. to provide a complete cure without a significant post cure operation. This curing operation should be substantially complete to prevent debonding of the silicone elastomer from the core when it is removed from the mold. Thereafter the surface of the silicone elastomer is sanded to remove the mold release agent and it is wiped clean with a solvent such as isopropyl alcohol to remove all debris. The following Examples further define and describe donor rolls prepared by the present invention and illustrate preferred embodiments of the present invention. Unless otherwise indicated, all parts and percentages are by weight.

EXAMPLES

Example 1

Viton® A fluoropolymer (500 g), benzyl triphenylphosphonium chloride (30 g), Lead oxide (75 g), and 2,2-bis(4-hydroxyphenyl) hexafluoropropane (12.5 g) were thoroughly compounded for 60 minutes in a two-roll mill at 63° F. (approx. 17° C.) with water cooling until a uniform, dry composite sheet was obtained. The uniform, dry, flexible composite sheet obtained was divided into small pieces. SFR-100 silicone (20 g) was added to 117.5 g of the composite sheet and both were suspended in a 85% methyl ethyl ketone and 15% methanol solution to form a 30 weight percent coating dispersion. Dispersion was formed by roll milling for approximately 3 hours. A testing sample was made according to the following procedure. An aluminum core was cleaned and then primed with a thin layer of silicone primer and dried in ambient air before application of the base cushion. The base cushion, a 230 mil thick polydimethylsiloxane was injection molded to a dry thickness of 0.230 inches and cured for 2 hours at 80° C. After demolding, the base cushion was ground to remove runout then corona treated for 1 minute at 750 watts, at 25 revolutions per minute. The above described dispersion was degassed for 2 minutes under 25 mm Hg before it was ring coated onto the base cushion layer. This donor roller was cured by air drying for 1 hour followed by 24 hours ramp to 230° C. and then 24 hours at 230° C. The dry thickness of the coating on the roller was 1 mil.

Example 2

Vitono® A fluoropolymer (500 g), benzyl triphenylphosphonium chloride (30 g), lead oxide (75 g), DC6-2230 (100 g)) (where the DC6-2230 is a polyfunctional poly(C$_{(1-6)}$ alkyl)phenylsiloxane polymer sold by Dow Corning) and 2,2-bis(4-hydroxyphenyl) hexafluoropropane (12.5 g) were thoroughly compounded for 60 minutes in a two-roll mill at 63° F. (approx. 17° C.) with water cooling until a uniform, dry composite sheet was obtained. The uniform, dry, flexible composite sheet obtained was divided into small pieces. The composite sheet and both were suspended in a 85% methyl ethyl ketone and 15% methanol solution to form a 30 weight percent coating dispersion. Dispersion was formed by roll milling for approximately 3 hours. A testing sample was made according to the following procedure. An aluminum core was cleaned and then primed with a thin layer of silicone primer and dried in ambient air before application of the base cushion. The base cushion, a 230 mil thick polydimethylsiloxane was injection molded to a dry thickness of 0.230 inches and cured for 2 hours at 80° C. After demolding, the base cushion was ground to remove runout then corona treated for 1 minute at 750 watts, at 25 revolutions per minute. The above described dispersion was degassed for 2 minutes under 25 mm Hg before it was ring coated onto the dry coated base cushion layer. This donor roller was cured by air drying for 1 hour followed by 24 hours ramp to 230° C. and then 24 hours at 230° C. The dry thickness of the coating on the roller was 1 mil.

Example 3

Viton® A fluoropolymer (500 g), benzyl triphenylphosphonium chloride (30 g), Lead oxide (75 g),, and 2,2-bis(4- hydroxyphenyl) hexafluoropropane (12.5 g) were thoroughly compounded for 60 minutes in a two-roll mill at 63° F. (approx. 17° C.) with water cooling until a uniform, dry composite sheet was obtained. The uniform, dry, flexible composite sheet obtained was divided into small pieces. SFR-100 silicone (20 g) was added to 117.5 g of the composite sheet and both were suspended in a 85% methyl ethyl ketone and 15% methanol solution to form a 30 weight percent coating dispersion. Dispersion was formed by roll milling for approximately 3 hours. A testing sample was made according to the following procedure. An aluminum core was cleaned and then primed with a thin layer of silicone primer and dried in ambient air before application of the base cushion. The base cushion, a 230 mil thick polydimethylsiloxane was injection molded to a dry thickness of 0.230 inches and cured for 2 hours at 80° C. After demolding, the base cushion was corona treated for 1 minute at 750 watts, at 25 revolutions per minute. A solution of Emerson & Cummings resin EC4952 25 wt % solids in MEK was ring coated onto the base cushion layer and cured by air drying for 12 hours to form a dry coated base cushion. The dry coated base cushion was corona treated for 1 minute at 750 watts, at 25 revolutions per minute. The above described dispersion was degassed for 2 minutes under 25 mm Hg before it was ring coated onto the dry coated base cushion layer. This donor roller was cured by air drying for 1 hour followed by 24 hours ramp to 230° C. and then 24 hours at 230° C. The dry thickness of the coating on the roller was 1 mil.

Example 4

A second roller was prepared as described in Example 3 for Machine testing.

Comparative Example 1

Several commercially available Xerox 5090 donor roller most likely manufactured according to U.S. Pat. No. 5,166,031 were obtained for comparative testing.

Testing of IPN Oiler Donor Rollers
Surface Energy Measurement and Wear Rate

The surface energy (S.E.) of the rollers was determined from contact angle measurements of distilled water and diiodomethane using Rame-Hart Inc., NRL model A-100 contact angle Goniometer.

The wear rate test of compression-molded slabs was performed using a Norman Abrader Device (Norman Tool Inc., Ind.). For this test, the Abrader Device was modified by replacing the standard grommet wheel with an aluminum rod (1.1 inch in length and 0.625 inch in diameter), placing a renewable paper strip on the samples, and running the tests at about 350° F. Cycles were accumulated until coating failure.

The Surface Roughness Ra was measured on a Federal 2000 surfanalyzer with a chisel stylus.

Oil swell was measured by immersing a weighed sample in 350 cs Dow Corning DC200 polydimethylsiloxane for 7 days at 175° C. and calculating the weight gain.

| Sample | Roller wear (mil) | Ra ($\mu$inch) | S.E. (dyne/cm) |
|---|---|---|---|
| EX 1 | 0.88 | 129 | 29.2 |
| EX 2 | 2.15200 | 16120 | 27.2 |
| EX-3 | 0.7 | 26 | 31.8 |
| CE 1 | 6.5 | 54 | 49 |

Toner Release Test

The test samples are employed to evaluate the toner offset and release force characteristics of the fuser member coating. Two samples are cut approximately 1-inch square of each example. One of these squares is left untreated by release agent (the dry sample). To the surface of the other sample is applied an unmeasured amount of Xerox amino-functionalized PDMS 8R79.

Each sample is incubated overnight at a temperature of 175° C. Following this treatment, the surface of each sample is wiped with dichloromethane. Each sample is then soaked in dichloromethane for one hour and allowed to dry before off-line testing for toner offset and release properties.

Each sample is tested in the following manner:

A 1-inch (2.56-cm) square of paper covered with unfused styrene-butadiene (EK IS110 toner) toner is placed in contact with a sample on a bed heated to 175° C., and a pressure roller set for 80 psi is locked in place over the laminate to form a nip. After 20 minutes the roller is released from the laminate.

The extent of offset for each sample is determined by microscopic examination of the sample surface following delamination. The following numerical evaluation, corresponding to the amount of toner remaining on the surface, is employed.

| 1 | 0% offset |
|---|---|
| 2 | 1–20% offset |
| 3 | 21–50% offset |
| 4 | 51–90% offset |
| 5 | 91–100% offset |

Qualitative assessment of the force required for delamination of the paper from the sample is as follows:

| 1 | low release force |
|---|---|
| 2 | moderate release force |
| 3 | high release force |

The following examples further illustrate the test results.

| Sample | Release/Offset - Silane | Release/Offset - NH$_3$ |
|---|---|---|
| EX 1 | 1/1-2 | 1/1-2 |
| EX 2 | 2/2 | 1/2 |
| EX-3 | 2/1 | 1/1-2 |
| CE 1 | 1/1 | 1/1 |

Machine Testing

Two rolls (Example 3 and Comparative Example 1) were used as release agent donor rollers for supplying conventional nonfunctional silicone oil in a Eastman Kodak IS110 test fixture. Results are shown below under identical testing conditions of 350° F. fuser roller temperature and a stainless steel metering roller. Both rollers showed long life and adequate oil delivery

| Sample | Copy Count | | | |
| --- | --- | --- | --- | --- |
| | 50 | 100 | 150 | 200 |
| EX-4 | 4 | 4 | 4.1 | 4 |
| CE 1 | 5 | 5 | 4.5 | 5 |

Thus, according to the present invention a new and improved release agent donor member and fusing assembly have been provided. In particular, a release agent donor member having greatly improved wear resistance has been provided. This is achieved with a interpenetrating polymer network donor roll coating capable of transporting functional release agent in sufficient quantities to the fuser roller while at the same time preventing penetration of the release agent into the intermediate silicone layer.

The release agent donor of this invention, particularly the fuser rollers, possess extremely desirable physical and mechanical characteristics as indicated in the tests results above. The fuser rollers have excellent toner release properties, without sacrificing toughness and abrasion resistance. The coating materials exhibit these desirable properties when they are prepared according to the process of this invention.

Parts List 20 fusing roller
28 pressure roller
30 nip
33 offset prevention oil
34 oil reservoir
36 wick
40 particulate imaging material
42 receiver
44 heating lamp
46 control circuit
48 metering roller
50 donor roller

What is claimed is:

1. A non-oil swelling, composite release agent donor member for a toner fixing system, the donor member comprising, in order:

a base member;

an optional intermediate layer; and an outermost layer comprising a polymeric composition containing a cured interpenetrating network of (a) fluorocarbon elastomer and (b) at least one silicone elastomer selected from the group consisting of a polyfunctional poly($C_{(1-6)}$ alkyl)siloxane polymer; polyfunctional poly($C_{(1-6)}$ alkyl)arylsiloxane polymer; and combinations thereof; wherein the outermost layer contains a metal oxide present in an amount sufficient to interact with a functionalized release agent which may be applied to the outer surface of said outermost layer; and wherein said fluorocarbon elastomer is present in an amount greater than 45 mole percent.

2. The donor member of claim 1 wherein the fluorocarbon elastomer comprises about 45–75 mole percent of vinylidenefluoride; about 14–40 mole percent of hexafluoropropylene; and about 25–40 mole percent of tetrafluoroethylene.

3. The release agent donor member of claim 1, wherein the polymeric composition comprises:

about 50–70 weight percent of a fluorocarbon copolymer;
about 1–50 weight percent of a curable siloxane polymer;
about 1–10 weight percent of a fluorocarbon curing agent;
about 1–12 weight percent of a fluorocarbon-curing accelerator;
about 4–30 weight percent of an acid acceptor filler; and
about 3 to 40 weight percent of a metal oxide filler,
all on a 100 weight percent basis.

4. The donor member of claim 3 wherein the fluorocarbon curing agent is a bisphenol crosslinking agent.

5. The donor member of claim 3 wherein the fluorocarbon curing accelerator is an organophosphonium salt.

6. The donor member of claim 1 wherein the metal oxide has a particle size diameter between 0.5 and 40.0 microns.

7. The donor member of claim 1 where the metal oxide is cupric oxide, cuprous oxide, or lead oxide.

8. The release agent donor member of claim 1, wherein the curable siloxane polymers of claim 1 are heat-curable polymers.

9. The release agent donor member of claim 1, wherein the curable polyfunctional poly($C_{(1-6)}$ alkyl)siloxane polymer comprises a silicone polymer comprising repeating units of the formula, $(R^1_a SiO_{(4-a)/2}$; wherein $R^1$ is $C_{(1-6)}$ alkyl and a is 0–3.

10. The release agent donor member of claim 9 wherein $R^1$ is methyl.

11. The release agent donor member of claim 1, wherein the silicone polymer comprises a polydimethylsiloxane having a number average molecular weight between 20,000 and 300,000 and a polymethylsiloxane comprising monofunctional and tetrafunctional siloxane repeating units and having a number average molecular weight between 1,000 and 10,000.

12. The release agent donor member of claim 1 wherein the silicone polymer comprises a silanol- or trimethylsilyl-terminated polymethylsiloxane and is a liquid blend comprising about 60 to 80 weight percent of a difunctional polydimethylsiloxane having a number average molecular weight of about 150,000, and 20 to 40 weight percent of a polytrimethylsilyl silicate resin having monofunctional and tetrafunctional repeating units in an average ratio of between 0.8 and 1:1, and having a number average molecular weight of about 2,200.

13. The release agent donor member of claim 1, wherein said siloxane polymer and said fluorocarbon copolymer are present in said polymeric composition in a ratio of 0.1–3.0:1.0 by weight.

14. The release agent donor member of claim 1 wherein the fluorocarbon/silicone elastomer interpenetrating network is from about 0.025 to about 0.1 millimeters in thickness.

15. The release agent donor member of claim 1 having a hardness of 35 to 45 Shore A.

16. A fusing assembly for fixing toner images to a substrate, comprising:

(A) a heated fuser roller;
(B) a pressure roller engaging said fuser roller and providing a nip therebetween;
(C) means to apply to the surface of said fuser roll a release agent having functional groups, said means including the release agent donor member of claim 1.

* * * * *